RONALD C. HOKE
JAMES R. FELIX  INVENTORS

BY David A. Roth

PATENT ATTORNEY

Aug. 2, 1966    R. C. HOKE ETAL    3,263,400
AIR TREATMENT
Filed July 16, 1963    2 Sheets-Sheet 2

RONALD C. HOKE
JAMES R. FELIX    INVENTORS

BY David A. Roth

PATENT ATTORNEY

United States Patent Office 3,263,400
Patented August 2, 1966

3,263,400
AIR TREATMENT
Ronald C. Hoke, Berkeley Heights, and James R. Felix, Westfield, N.J., assignors to Esso Research and Engineering Company, a corporation of Delaware
Filed July 16, 1963, Ser. No. 295,396
10 Claims. (Cl. 55—33)

This invention relates to the transfer of gases into and out of an enclosed space while substantially excluding contaminants from the enclosed space. In particular, it relates to methods and/or apparatus for transferring gases, e.g. air, into and out of an enclosed space so as to cause the space to be ventilated while providing simultaneous protection from airborne, toxic agents, pollutants or contaminants, such as war gases, bacteriological agents, smog, hydrocarbon odors, and the like.

Even more particularly, it relates to the transfer of gas, e.g. air, into and out of an enclosed space while minimizing the transfer of heat into and out of said enclosed space and while providing simultaneous protection to said enclosed space from airborne contaminants, toxic agents, pollutants, and the like.

With even greater particularity, the invention relates to the transfer of gas, e.g., air masses into and out of an enclosed space while (1) minimizing the transfer of heat into and out of the enclosed space, (2) controlling the transfer of moisture into and out of the enclosed space, and (3) controlling the transfer of airborne, toxic agents such as gases and bacteriological agents into and out of the enclosed space.

The use of what is referred to as the "heatless ventilation" technique to remove water and various air pollutants while minimizing the transfer of heat and controlling the transfer of water has been disclosed in copending application filed May 21, 1963 in the name of Charles W. Skarstrom, entitled "Processing of Gases" which received Serial No. 281,874. The entire disclosure of said copending Serial No. 281,874 is incorporated herein by reference. However, as much of said Serial No. 281,874 will be repeated herein as is necessary to eliminate the need for constant referral to said Serial No. 281,874. The basic invention of copending application Serial No. 281,874, of which the instant application is an inventive improvement, is the discovery that an effective heat barrier can be formed between an enclosed space and its environment which barrier allows the transfer of relatively large volumes of gas between the enclosure and its surroundings with a minimum transfer of heat therebetween.

Also, the invention of copending Serial No. 281,874 includes the discovery that moisture transfer in and out of an enclosed space can be controlled while maintaining the heat barrier or the moisture can be controlled while the temperature inside the enclosed space and outside the enclosed space is the same. The invention of Serial No. 281,874, therefore, teaches how to transfer relatively large volumes of gases between an enclosed space and its surroundings while minimizing heat transfer and controlling moisture transfer.

From the above it will be realized that the heatless ventilation described is a means to provide heating or cooling economies since it conserves the sensible heat or coolness in the enclosed space. With heatless ventilation the major load on heating or cooling equipment is in overcoming heat losses or gains from, or into, the enclosed space through walls, windows, etc. rather than heating or cooling a large flow of ventilating air. Heatless ventilation can also dry incoming, ventilating air thus reducing cooling load as well as dehumidification requirements.

To set the background of the instant invention, a specific illustration of the invention of copending Serial No. 281,874 is given. In the illustration, two beds of adsorbent, which are selective for moisture and also retain heat, provide clean air ventilation. These beds act alternately (a) to receive incoming, ambient ventilation air to an enclosure, and (b) to exhaust the air from this enclosure. For this illustration, consider the case of hot, moist, incoming ambient air to an enclosure maintained at cooler, drier conditions. The first bed receives the incoming air and adsorbs moisture and retains heat from this air. The second bed simultaneously exhausts air from the enclosure and gives up the moisture and heat retained in it to the exhausting air. Following removal of heat and moisture from the second bed, it is in condition to again receive hot, moist, incoming air and it is switched to this service. The first bed is now in condition to require removal of heat and moisture by exhaust air, and it is switched to this service. A small flow of additional dry air purge to the enclosure, or other means of reducing moisture, may be required to provide the incremental driving force for moisture removal. Cyclic operation of the two beds of adsorbent in this manner allows them to maintain the enclosure at the desired condition with a smaller expenditure of energy for cooling and dehumidification. The same principle of operation governs other combinations of incoming air and enclosure air conditions.

The improvement of the instant invention involves integration of the heatless ventilation technique to result in an apparatus (machine) and process designed to provide maximum protection from toxic agents. In general, one means of providing this protection is to decontaminate personnel before they enter a main enclosure. This is carried out by providing a heavy flow of decontaminated air which moves in a direction counter-current to the direction of entering personnel. This blows off most of the contaminants carried in on the clothing of the entering personnel and also provides a well ventilated area where such personnel can remove contaminated clothing. The flow of decontaminated air is generally supplied to an air lock. The air lock is an enclosure designed to permit the decontaminated air to exit continually from it while preventing the entry of outside (usually contaminated) air within it. The decontaminated personnel then enter the main enclosure through a second door. However, a small amount of toxic agents may still be carried into the main enclosure by personnel entering from the air lock. To remove these agents, a flow of decontaminated, ventilating air is maintained through the main enclosure. The main enclosure can also be maintained at a pressure slightly higher than atmospheric pressure to prevent contaminated air from leaking into the enclosure.

The invention can be fully understood by referring to both the preceding and following descriptions, the claims taken in conjunction therewith, and by the accompanying drawings wherein:

Figure 1:
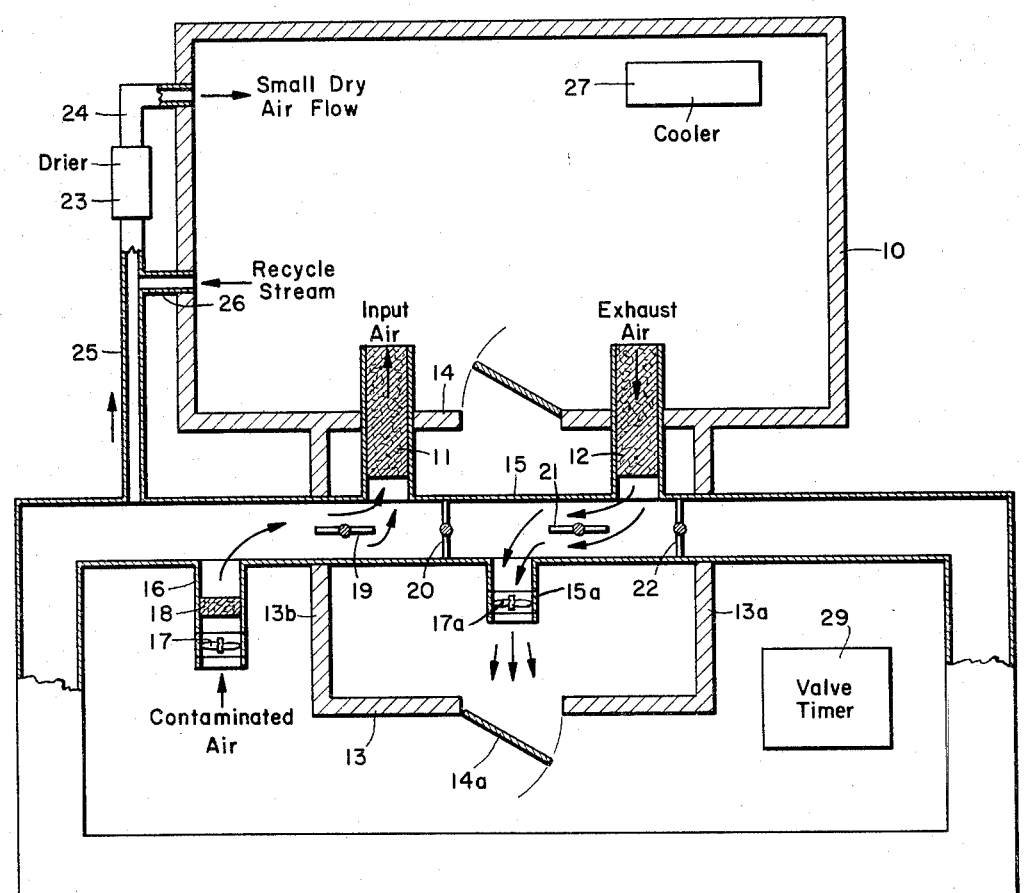
FIGURE 1 is a schematic diagram of an apparatus and a process illustrating the use of the heatless ventilation concept to decontaminate and ventilate an enclosed space as well as providing a flow of decontaminated air for sweep flow through an air lock.

Referring now to FIGURE 1, a closed space 10 is shown having two adsorbent regenerator beds 11 and 12, respectively. Adjacent to enclosed space (enclosure) 10, but separated therefrom by a common partition, is air lock 13. Regenerator beds 11 and 12 project through partition 14 which separates enclosed space 10 and air lock 13. Conduit 15 projects through two parallel walls 13a and 13b of air lock 14, which walls are perpendicular to partition 14, communicates with regenerator 11 and 12, air lock 13 and fan conduit 16. Fan conduit 16 communicates with the outside air through fan 17 and contaminant removal filter 18. Air lock 13 has a movable section 14a which permits exhaust air to exit from air lock 13 but does not permit outside air to enter air lock 13. Conduit 15 is provided with butterfly valves 19, 20, 21 and 22 and air lock conduit 15a which is parallel to air lock wall 13a and 13b. Conduit 15a is located between valves 20 and 21.

Dried 23 is optionally available to provide a small, dry air flow into enclosed space 10 through line 24. Decontaminated air from the outside is provided to drier 23 through conduit 25. Drier 23 can also use treated air from inside enclosure 10 which is provided through line 26. In this particular embodiment enclosure 10 is also provided with cooler 27.

For the purposes of illustrating an embodiment of an actual operation it is assumed that ambient conditions are hot and humid and that cool, dry conditions are desired inside enclosure 10. Contaminated air which is hot and humid is drawn into fan conduit 16 by fan 17 where it passes through contaminant removal filter 18, passes to conduit 15 through open butterfly valve 19 where it is prevented from flowing any further down conduit 15 by closed butterfly valve 20 and allowed to flow through adsorbent regenerator 11 where it is cooled and dehumidified.

Simultaneously, exhaust gas is forced out of enclosure 10 through adsorber regenerator 12 and into conduit 15 where it flows through open butterfly valve 21 through air lock conduit 15a and into air lock 13 where it sweeps through air lock 13 and exits through section 14a. The exhaust air is confined to the indicated portion of conduit 15 and forced through conduit 15a by closed butterfly valves 20 and 22.

The exhaust gas exiting from regenerator bed 12 removes moisture and heat from bed 12 and consequently this gas is exiting from bed 12 in a hot, humid condition. However, it is decontaminated air and provides the source of sweep gas for air lock 13. If a small flow of dry air into enclosure 10 is needed to maintain driving force out of enclosure 10, this can be obtained by means of drier 23 as described above. Cooler 27 is used in this particular embodiment to make up for heat gains through the walls of the enclosure or other heat gains into the enclosure. However, these cooling facilities are very small compared with those which would be required without heatless ventilation.

When the directions of flow are reversed so that incoming air is passing through regenerator 12 and outcoming air is passing through regenerator 11, the valves are positioned so that valve 19 is closed, valve 20 is opened, valve 21 is closed and valve 22 is open. This direction of flow from fan conduit 16 is through conduits 15 and through butterfly valve 22. Outcoming air from regenerator 11 is conveyed into air lock 13 through conduit 15a. The valves can be automatically actuated by valve timer 29. The connections between valve timer 29 and the valves are conventional and are not shown.

Although the above-described embodiment is with respect to environments where the outside contaminated air is hot and humid, it is clear that the process and apparatus of FIGURE 1 also applies with obvious modifications to situations where the outside air is cool and dry and the interior conditions within enclosure 10 are desired to be warm and moist. In such a situation a heater would be provided instead of cooler 27. Auxiliary drier 23 would probably be unnecessary depending upon the actual ambient humidity. If outside ambient humidity is extremely low, such as would be the case in the Arctic, the auxiliary gas flow through conduit 24 may have to be humidified. In this instance, the adsorbent regenerator beds 11 and 12 would be timed to prevent the removal of water generated inside enclosure 10 thus trapping water within enclosure 10 and maintaining a higher humidity. Optionally, fan 17a can be provided in a suitable location such as shown in conduit 15a to furnish additional air propulsion.

The above-described technique is, of course, applicable where the outside air is hot and arid and where cool, moist conditions are desired inside the enclosure 10.

Figure 2:
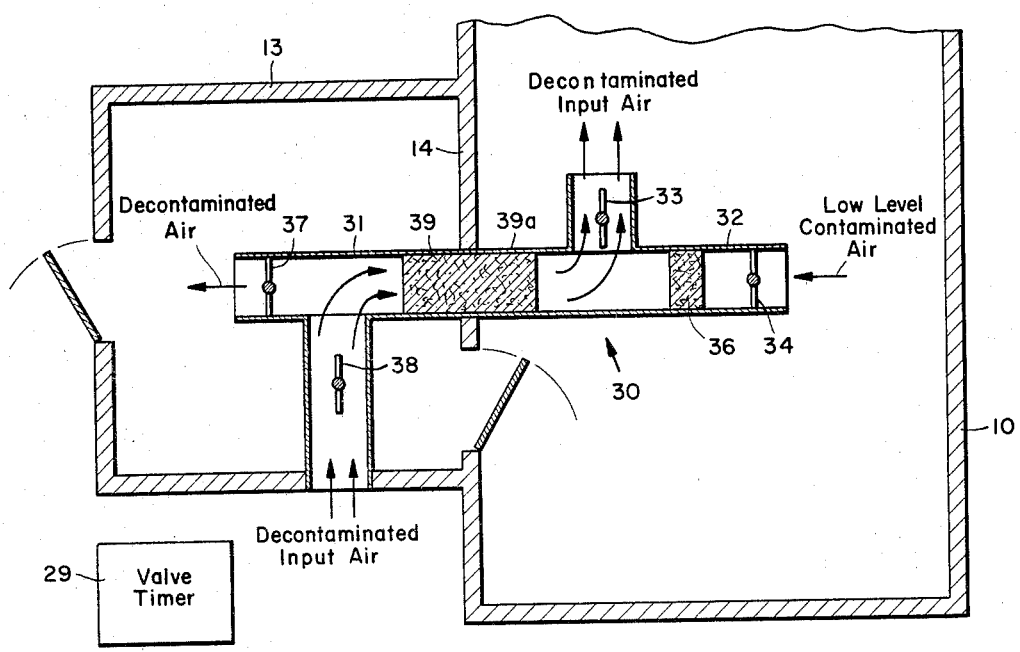
FIGURE 2 is a schematic diagram illustrating an apparatus and process for applying the heatless ventilation concept to decontaminate and ventilate an enclosed space as well as to provide a flow of air through an air lock.

Referring now to FIGURE 2, an alternative embodiment of the invention is illustrated. In this embodiment, the low level contamination present in enclosed space 10 is removed from enclosed space 10. Partition 14 has mounted in it hollow adsorbent regenerator conduit 30. Adsorbent regenerator conduit 30 has an L shaped, open outer end portion 31 projecting into air lock 13 and has an L shaped open inner end portion 32 which projects into the enclosed space 10. L shaped end portions 31 and 32 each have one hollow leg extending longitudinally from regenerator conduit 30 and one hollow leg extending perpendicularly from regenerator conduit 30. Butterfly valve 33 is mounted in one leg of end portion 32 and butterfly valve 34 is mounted in the other leg of end portion 32. Contaminant removal filter 36 is located in the longitudinal leg with valve 34. Butterfly valve 37 is located in one leg of end portion 31 and butterfly valve 38 is located in the other leg of end portion 31. There is adsorbent 39 in the intermediate portion 39a of adsorbent regenerator conduit 30.

In a typical operation, hot, humid air, which has been previously decontaminated, is introduced into end 31 through open valve 38, allowed to pass through adsorbent 39 and exit into the interior (enclosed space 10) through the perpendicular leg of end 32 by means of open valve 33. On this cycle valves 37 and 34 are closed.

On the exhaust cycle where the air from enclosed space 10 is to be exhausted through air lock 13, valves 33 and 38 are closed and valves 34 and 37 are open. The cool, dry, low level, contaminated air in enclosed space 10 is passed through open valve 34, through contaminant removal filter 36 through adsorbent 39 and out through the longitudinal leg of end 31 which has valve 37 mounted therein. Contaminant removal filter 36 should be replaced periodically but will last quite a long time since the interior contamination in enclosed space 10 is at such a low level.

Figure 3:
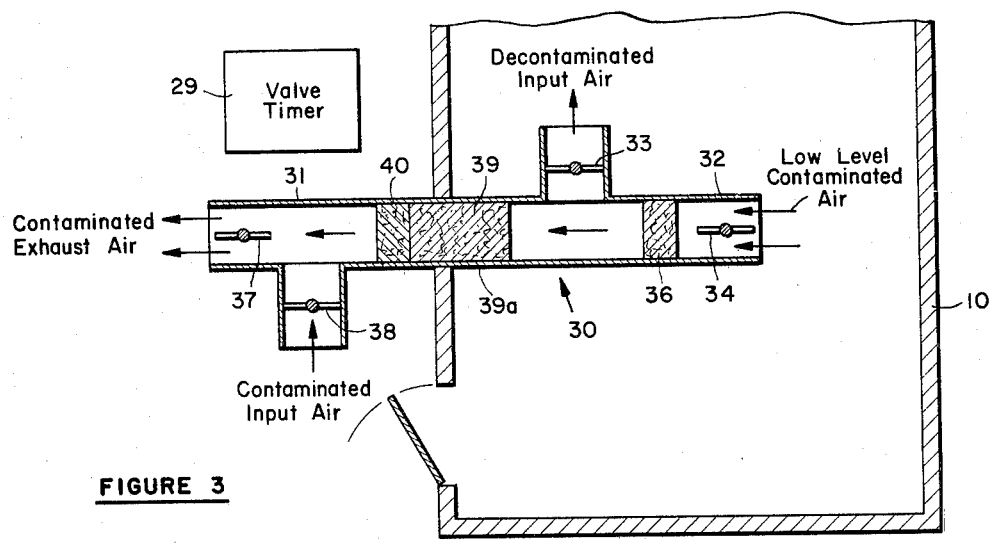
FIGURE 3 is a diagram of a process and apparatus illustrating an embodiment of the invention where heatless ventilation is used to ventilate an enclosed space as well as to remove atmospheric contaminants.

FIGURE 3 is substantially identical to FIGURE 2 except that it covers the situation where the exhaust is not into air lock 13 but, rather, directly into the exterior of enclosed space 10. Moreover, the air introduced into the apparatus is contaminated air and, therefore, adsorbent 39 must be of the type which is capable of removing contaminant agents. Supplementary adsorbent filter 40 can be provided to remove most of the exterior contaminants before they pass into adsorbent 39. Filter 40 is substantially regenerated by the action of the apparatus.

In FIGURES 2 and 3, FIGURE 2 shows output flow and FIGURE 3 shows exhaust flow. The valves are controlled by valve timer 29 so as to direct flow properly. The connection between timer 29 and the valves need not be shown since they are conventional. While FIGURES 2 and 3 show only one regenerator apparatus, it will be understood that they are used in pairs.

It should be noted that in FIGURE 3 the entire adsorbent 39 can be a material which will remove contaminants. This material is continually regenerated and this obviates frequent replacement of contaminant removal adsorbent materials. It is important to note that the exhaust gas of the FIGURE 3 technique is contaminated and, therefore, the technique of FIGURE 3 is not applicable where air locks are required. Modification of the embodiments of FIGURES 2 and 3 for different conditions of ambient air such as hot, arid, or cool, dry, will be clear from the above discussion to one skilled in the art.

In sum, the improvement of heatless ventilation used for the instant invention can find application in any enclosed space where controlled interior conditions are required together with simultaneous protection from airborne toxic agents and/or pollutants. The technique can be used in such enclosure as tents, hospitals, bunkers, instrument vans, office buildings and homes, underground shelters, tanks, and other personnel carriers, and the like.

The term regenerator is used herein to refer to a hollow conduit through which air is passed. The conduit can be capable of heat transfer because of its particular material of construction. The term regenerator also includes hollow conduits containing a packing material. The packing material can be of a nature that only permits heat transfer without providing any ability to pick up moisture or other air contaminants. But the packing material can also be of an adsorbent or absorbent nature which will effect moisture pickup alone or with heat transfer as well as pickup of airborne pollutants such as pollen, dust, smoke, bacteria, hydrocarbons, poison gases, irritants, and the like.

Examples of packing materials that may be used are glass beads, slica gel, metal particles or granules, activated carbons, desiccants, molecular sieves, and the like. It will be understood that these packing materials are of a size, weight and quantity to permit the passage of ventilating air therethrough.

While preferred embodiments of the invention have been shown, it is to be understood that various changes and modifications can be made in the machine and process of the invention by those skilled in the art without departing from the spirit of the invention as defined in the appended claims.

It will also be understood that although the terms fan and blower are used herein, any equivalent gaseous propulsion means can be used.

What is claimed is:

1. A method of ventilating a region comprising an enclosed space by transferring gas from said region to a second region of a different temperature with substantially no change in the temperature of the region comprising an enclosed space which comprises in combination:
   (a) Flowing gas cyclically through a first heat transfer zone which zone provides a passage between said regions, said zone being characterized by a heat capacity greater than the total of said gas flowing through it per cycle;
   (b) Simultaneously flowing gas cyclically through a second heat transfer zone which second zone provides a passage between said regions, said second zone being characterized by a heat capacity greater than the total of said gas flowing through it per cycle;
   (c) Cyclically alternating the direction of flow of gas through said first zone and said second zone, wherein the flow of gas through the zones is such that substantially no breakthrough of the heat within said zones occurs and wherein flow through a zone into one of said regions is accompanied by flow out of the same region through the other zone;
   (d) Conveying the flow of gas out of said region comprising an enclosed spaced into a third region while not permitting gas from said second region from entering said third region and not permitting gas from said third region to enter said region comprising an enclosed space.

2. A method according to claim 1 wherein said region comprising an enclosed space and said second region have different moisture contents and wherein there is substantially reduced transfer of water from said second region to said region comprising an enclosed space and wherein said zones are characterized by an ability to catch water.

3. A method according to claim 1 wherein gas is decontaminated before being introduced into said region comprising an enclosed space.

4. A method according to claim 2 wherein gas is decontaminated before being introduced into said region comprising an enclosed space.

5. A method of ventilating a region comprising an enclosed space by transferring gas from said region to a second region having a different moisture content with substantially reduced transfer of moisture from said second region to said region comprising an enclosed space which comprises in combination:
   (a) Flowing gas cyclically through a first moisture barrier zone which zone provides a passage between said regions, said zone being characterized by the property of being able to contain at least a portion of the moisture of said gas flowing through it per cycle;
   (b) Simultaneously flowing gas cyclically through a second moisture barrier zone which second zone provides a passage between said regions, said second zone being characterized by the property of being able to contain at least a portion of the moisture of said gas flowing through it per cycle;
   (c) Cyclically alternating the direction of flow of gas through said first zone and said second zone, wherein the flow of gas through the zones is such that a substantially reduced breakthrough of the moisture within said zones occurs and wherein flow through a zone into one of said regions is accompanied by flow out of the same region through the other zone;
   (d) Conveying the flow of gas out of said region comprising an enclosed space into a third region while not permitting gas from said second region from entering said third region and not permitting gas from said third region to enter said region comprising an enclosed space.

6. A method according to claim 5 wherein moisture is permitted to break through out of said regions comprising an enclosed space but is at least partially constrained from breaking through into said region comprising an enclosed space.

7. A method according to claim 5 wherein gas is decontaminated before being introduced into said region comprising an enclosed space.

8. A method according to claim 6 wherein gas is decontaminated before being introduced into said region comprising an enclosed space.

9. A ventilation apparatus comprising in combination:
   (a) An enclosure;
   (b) An air lock adjacent to said enclosure;
   (c) Two identical regenerators having inner ends and outer ends, said inner ends communicating with said enclosure;
   (d) A conduit communicating with said outer ends of said regenerators, said air lock and the exterior of said enclosure and said air lock, said conduit having four valves, *a*, *b*, *c*, and *d*, each of said valves being capable of stopping a flow through said conduit when in the closed position and said valves being located on each side of said outer ends of said regenerators, and co-acting with said regenerators, air lock, and conduit so that when valves *a* and *c* are in the open position, valves *b* and *d* are in a closed position and flow is from the exterior through one of said regenerators into said enclosure and simultaneously out of said enclosure through the other of said regenerators, through said conduit and into said air lock and when valves *b* and *d* are in the open position, valves *a* and *c* are in a closed position, and flow is from the exterior through the other of said regenerators into said enclosure and simultaneously out of said enclosure through the one of said regenerators through said conduit and into said air lock;
(e) Propulsion means to provide the driving force for moving gases through said conduit and said regenerators as described in paragraph (c).

10. An apparatus according to claim 9 wherein the portion of said conduit communicating with the exterior is provided with contaminant removal means.

References Cited by the Examiner

UNITED STATES PATENTS

| | | | |
|---|---|---|---|
| 1,880,196 | 10/1932 | Dow et al. | 165—4 |
| 2,011,117 | 8/1935 | Richter | 98—33 |
| 2,753,950 | 7/1956 | Baker et al. | 55—179 X |

REUBEN FRIEDMAN, *Primary Examiner.*